Nov. 15, 1938.     C. VOGT     2,136,531

WHEEL FOR ROLLER SKATES

Filed July 5, 1934

Inventor:—
Clarence Vogt
by his Attorneys
Howson & Howson

Patented Nov. 15, 1938

2,136,531

UNITED STATES PATENT OFFICE 2,136,531

WHEEL FOR ROLLER SKATES

Clarence Vogt, Wenonah, N. J.

Application July 5, 1934, Serial No. 733,876

7 Claims. (Cl. 301—5.7)

This invention relates to wheel structures for roller skates and the like and has for its principal object the provision of a structure comprising separate and distinct units which may be replaced at will and which are interlockable one with another and held in assembled relation by a single nut.

A more specific object of the invention is to provide a wheel unit constituting a tire member and one or more ball bearing units adapted for removable mounting on the wheel axis or shaft, which elements are interlockable one with another.

Another object of the invention is to provide a novelly constructed ball bearing unit for use in a roller skate wheel or like device.

Still another object of the invention is to provide a wheel construction embodying relatively few simple parts which may be easily and economically manufactured and which may be easily assembled and replaced.

The invention may be more fully understood from the following detailed description and the accompanying drawing.

Figure 1:
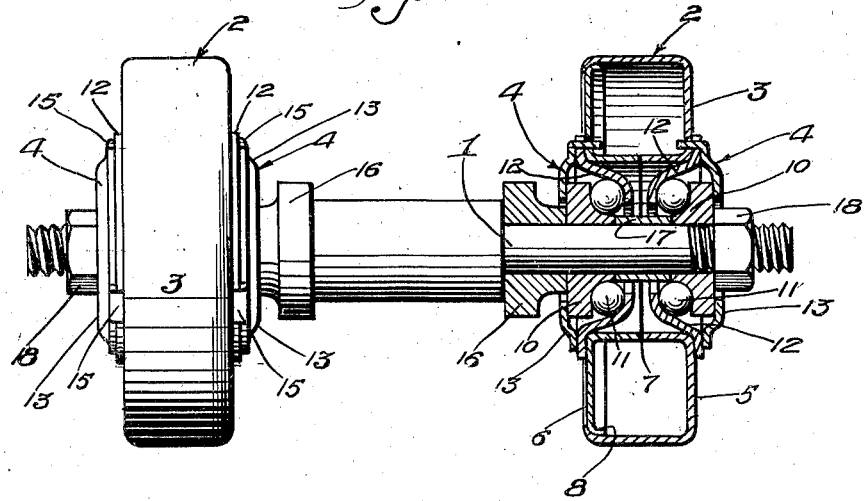
Fig. 1 is a front elevational view of a roller skate wheel assembly embodying the features of the invention, one of the wheel structures being shown in section.
Figure 2:
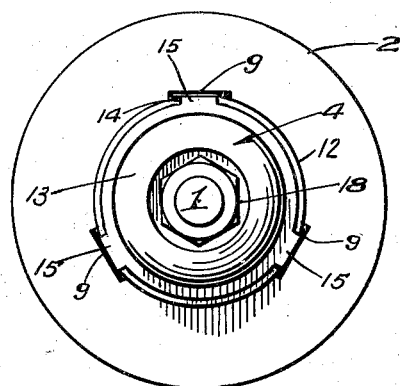
Fig. 2 is a side view of one of the wheels.
Figure 4:
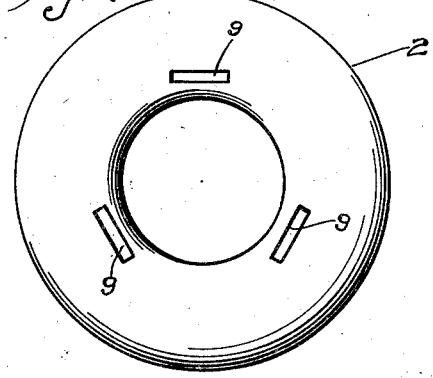
Fig. 4 is a face or side view of the tire member.

Referring to the several views of the drawing and particularly to Fig. 1, the shaft or axle 1 has mounted at each end thereof a wheel 2 which embodies the novel features of construction now to be described. The wheel comprises essentially a wheel unit or tire member 3 and a pair of similar ball bearing units 4 seated within the tire member. The tire member is preferably formed as a tubular annulus comprising annular parts 5 and 6. These parts are shaped as shown clearly in Fig. 1 with their inner edges substantially abutting, as at 7, and with their outer edges flanged or bent into overlapping relation, as at 8. By this construction, the part 6 is securely held in place by virtue of its being locked in at its peripheral edge portion by the inwardly-extending flanged edge of part 5. In each of the opposite faces or sides of the tire member, there are provided a number of spaced slot openings 9 (see Fig. 4), there being three such openings shown, although it will be understood that any desired number of openings may be employed. The purpose of these openings will be explained presently.

Each of the ball bearing units 4 comprises a race block 10 and balls 11 confined between a race plate 12 and a cover plate 13. The race plate 12 is formed cooperatively with the race block 10 to provide an annular race or runway for the balls 11, as clearly illustrated. The race block 10 is securely held between the annularly arranged balls and the inner face or wall of cover plate 13.

Figure 3:
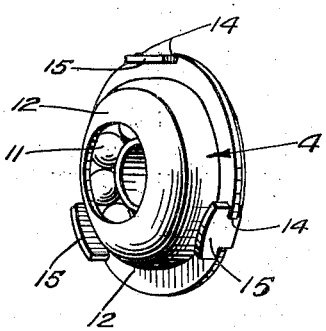
Fig. 3 is a perspective view of one of the ball bearing units.

Race plate 12 is provided at its peripheral edge with spaced notches or recesses 14 which are similar in number and spacing to the openings 9 in the tire member. The cover plate 13 is slightly smaller in diameter than the race plate 12 and is provided with spaced T-shaped lugs or detents 15. These lugs are adapted to be bent, as shown clearly in Figs. 1 and 3, so that their narrow portions seat snugly within the notches 14 and their wider portions serve to securely lock the race plate 12 and the cover plate 13 together. The heads of the lugs or detents protrude beyond the race plate 12 and are of such dimensions that they fit snugly in the spaced openings 9 of the tire member, as shown clearly in Fig. 1. It will be seen that the constituent elements of the ball bearing structure form a novel unit which is adapted to cooperate with the tire member or unit in a novel manner. The ball bearing unit is not limited in use to the wheel of the skate but may be used wherever possible.

In the assembled structure, as illustrated in Fig. 1, a collar 16 is removably mounted upon the axle or shaft and abuts against the race block 10 of the inner ball bearing unit. A sleeve 17 is removably mounted upon the axle or shaft and is interposed between the race blocks of the ball bearing units. The sleeve extends through the race plates and abuts the race blocks. A nut 18 is threadedly mounted on the end of the axle and engages the outer face of the race block of the outer ball bearing unit.

In assembling the parts, the collar 16 is first placed on the shaft or axle and the inner ball bearing unit is placed upon the shaft in abutting relation with the collar. The tire member is then placed about the shaft with the detents of the inner ball bearing unit in fitting relation with the tire member. The sleeve 17 is placed upon the shaft and the outer ball bearing unit is mounted on the shaft in interlocking relation with the tire member. Finally, the nut 10 is screwed into place and serves to maintain the parts in assembled relation.

From the above description, it will be seen that the invention provides a novel construction embodying a minimum of simple parts which are adapted for easy assembly. It will also be seen that the various parts constitute separate and distinct units which may be readily replaced whenever necessary. This feature is particularly important as it enables the replacement of worn parts and eliminates any necessity for replacing a complete wheel or even the entire skate. The construction of the wheel proper as a tire unit or member, which may be readily replaced and which is adapted to interfit with the ball bearing units without the necessity of auxiliary fastening devices, is very important, particularly since it is this part of the wheel which is subjected most to frictional wear and which is apt to need replacement. It is important to note that the construction is such that replacement of any of the parts does not necessitate any change in shape or manipulation of the parts.

Although a preferred embodiment of the device has been illustrated and described for the purpose of disclosure, it will be understood that various modifications may be made without departing from the scope of the invention. Furthermore, although the invention is particularly directed to roller skate wheel structures, it will be understood that it is applicable in any instance where such a wheel structure may be used.

I claim:

1. A ball bearing unit comprising a race plate, a race block, said plate and said block being constructed and arranged so as to cooperatively provide an annular race or runway for bearing balls, and a cover plate adjacent said race block and serving to hold the same in position, said race plate and said cover plate having interlocking notches and detents respectively spaced about their peripheral edges.

2. A ball bearing unit comprising a race plate, a race block, said plate and said block being constructed and arranged so as to cooperatively provide an annular race or runway for bearing balls, and a cover plate adjacent said race block and serving to hold the same in position, said race plate and said cover plate having interlocking peripheral notches and T-shaped detents respectively.

3. In a wheel structure, a wheel member, a pair of ball bearing units, each of said units comprising a race plate and a cover plate having interlocking notches and detents respectively, said detents removably interfitting each of said units with said wheel member.

4. In a wheel structure, a tire member, said tire member having spaced openings in its side walls, a pair of ball bearing units seated within said tire member from opposite sides thereof, each of said units comprising a race plate and a cover plate having interlocking peripheral notches and detents respectively, said detents extending through said openings so as to removably interfit said tire member with said units.

5. In a wheel structure, a tire member, said tire member having spaced openings in its side walls, a pair of ball bearing units seated within said tire member from opposite sides thereof, each of said units comprising a race plate and a cover plate having interlocking peripheral notches and T-shaped detents respectively, said detents extending through said openings so as to removably interfit said tire member with said units.

6. In a wheel structure, a tire member, said tire member having spaced openings in its side walls a pair of ball bearing units seated within said tire member from opposite sides thereof, each of said units comprising a race plate with peripheral notches therein and a cover plate with detents extending into said notches, said detents extending through said openings so as to removably interfit said tire member with said units.

7. In a wheel structure, a tire member, said tire member having spaced openings in its side walls, a pair of ball bearing units seated within said tire member from opposite sides thereof, each of said units comprising a race plate, a race block, said plate and said block being constructed and arranged so as to cooperatively provide an annular race or runway for bearing balls, and a cover plate adjacent said race block and serving to hold the same in position, said race plate and said cover plate having interlocking notches and detents spaced about their peripheral edges respectively, said detents extending into said openings so as to removably interfit said tire member with said units.

CLARENCE VOGT.